United States Patent [19]

Hiromi

[11] Patent Number: 5,681,533
[45] Date of Patent: Oct. 28, 1997

[54] ENVIRONMENT DECONTAMINATING SYSTEM HAVING AIR CLEANING AND DEODORIZING FUNCTION

[75] Inventor: Tsutomu Hiromi, Otsu, Japan

[73] Assignee: Yushin Engineering, Japan

[21] Appl. No.: 550,450

[22] Filed: Oct. 30, 1995

Related U.S. Application Data

[63] Continuation of Ser. No. 209,781, Mar. 11, 1994, abandoned.

[30] Foreign Application Priority Data

Mar. 15, 1993 [JP] Japan ............... 5-78543

[51] Int. Cl.$^6$ ............... A62B 7/08
[52] U.S. Cl. ............... 422/121; 55/15; 55/18; 55/62; 55/98; 422/122; 422/170; 422/177; 422/186.07
[58] Field of Search ............... 422/121, 122, 422/5, 169, 170, 177, 180, 186.07; 55/124–126, 134; 96/15, 18, 62, 98

[56] References Cited

U.S. PATENT DOCUMENTS

| | | | |
|---|---|---|---|
| 4,049,400 | 9/1977 | Bennett et al. | 422/4 X |
| 4,133,652 | 1/1979 | Ishikawa et al. | 55/126 |
| 4,244,712 | 1/1981 | Tongret | 55/124 |
| 5,214,014 | 5/1993 | Yoshimoto et al. | 502/84 |

FOREIGN PATENT DOCUMENTS

| | | |
|---|---|---|
| 55-37483 | 9/1980 | Japan. |
| 6433004 | 2/1989 | Japan. |
| 1115352 | 12/1990 | Japan. |
| 3143524 | 6/1991 | Japan. |

*Primary Examiner*—Robert J. Warden
*Assistant Examiner*—Krisanne M. Thornton
*Attorney, Agent, or Firm*—Price, Heneveld, Cooper, DeWitt & Litton

[57] ABSTRACT

An environment decontaminating system has an air cleaning and deodorizing function. It includes a housing having an inlet and an outlet for passage of air. A DC high voltage dust collector and a dust catching filter are provided adjacent the inlet. An ozone generator is positioned adjacent the filter. An odor/ozone turbulent mixing plate is positioned adjacent the ozone generator. A deodorizing catalyst is positioned adjacent the mixing plate. An acid gas absorbent, a suction scavaging fan, and an ozone concentration sensor are positioned adjacent an outlet of the housing.

8 Claims, 9 Drawing Sheets

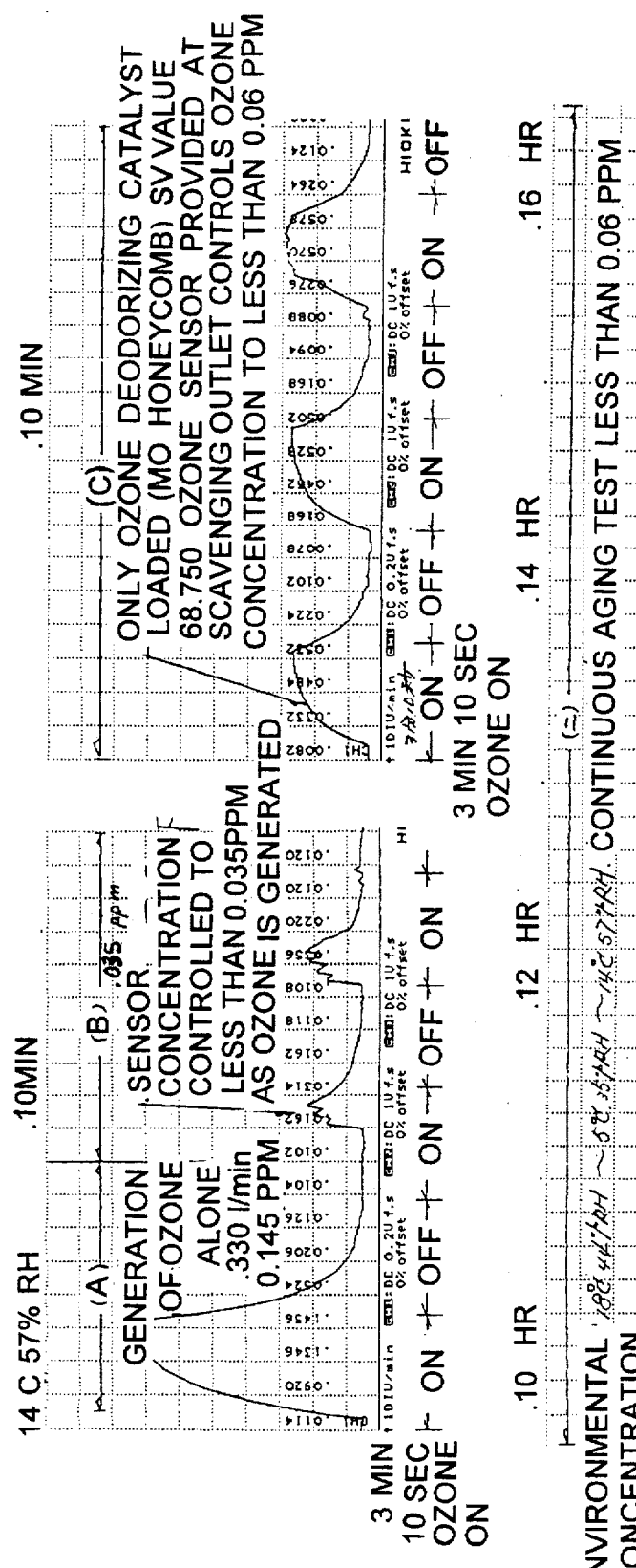
Fig. 8
Fig. 9
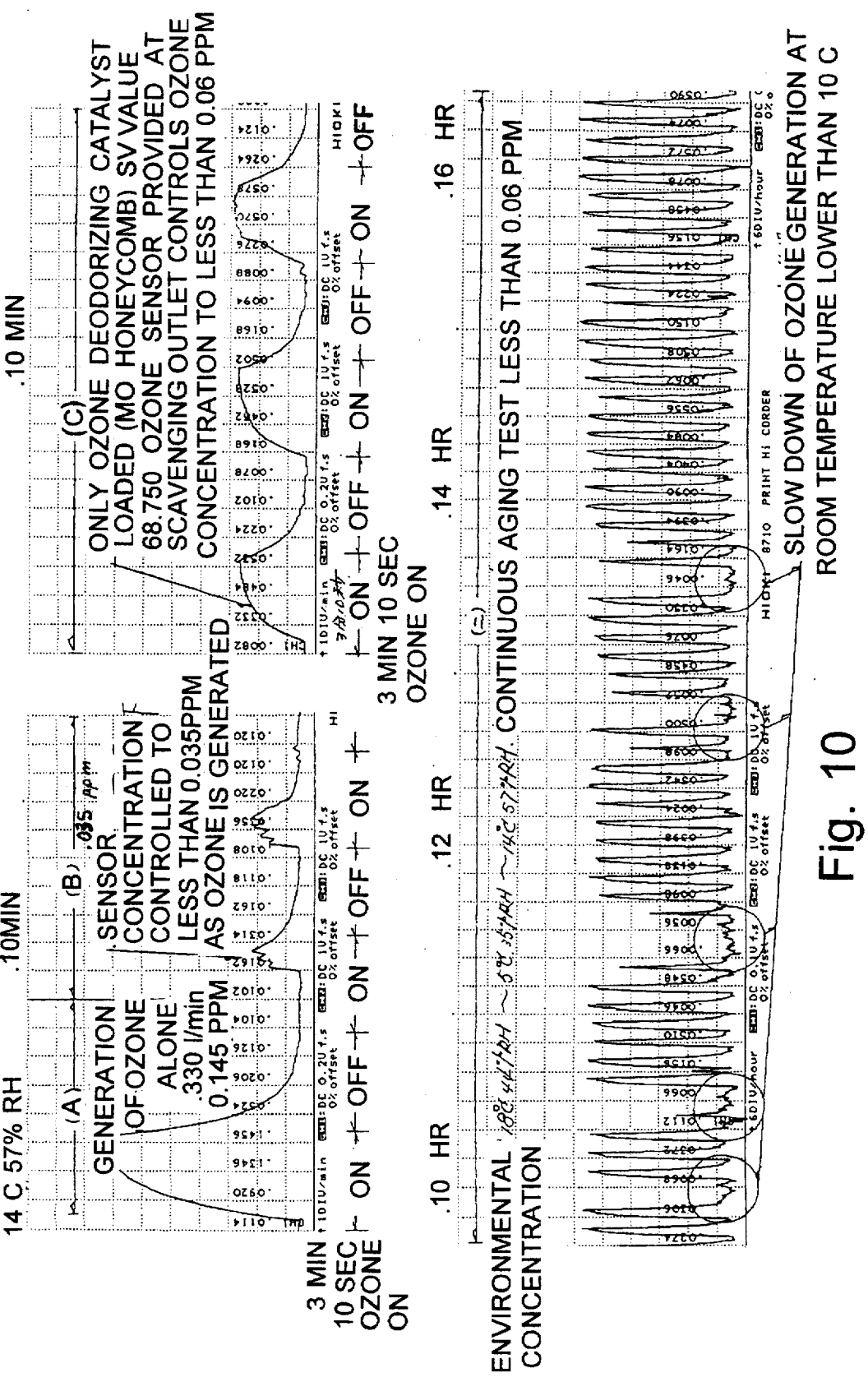
Fig. 10

GENERATION OF OZONE

ALLEVIATING EFFECT OF THE INVENTIVE SYSTEM NOx AND SOx

|  | BEFORE OPERATION (IN OFFICE) | DURING OPERATION |
|---|---|---|
| NOx | 40 PPB | 3 PPB |
| SOx | 5 PPB | 1 PPB LESS THAN 1 PPB |

ENVIRONMENT DECONTAMINATING SYSTEM HAVING AIR CLEANING AND DEODORIZING FUNCTION

CROSS REFERENCE TO RELATED APPLICATION

This is a continuation of application Ser. No. 08/209,781, filed Mar. 11, 1994 now abandoned.

BACKGROUND OF THE INVENTION

The present invention relates to an environment decontaminating system having air cleaning and deodorizing functions used to eliminate air pollution generated within human housing facilities and, more particularly, to such systems providing dust collection, deodorization, acid gas adsorption and air sterilization.

More specifically, the invention relates to such environment decontaminating systems used for various indoor environments such as office buildings, domestic rooms, restaurants, tea houses, vehicles, ships, clubhouses, karoke houses, barber shops, beauty salons, sickrooms and kitchens to achieve desired functions such as dust collection, deodorization, air sterilization and acid gas adsorption, thereby realizing air decontaminating effect, as well as forest bathing effect, both of which are naturally provided under the effect of negative ions.

There have already been proposed various techniques for cleaning indoor air. For example, a first technique collects dust using AC or DC boosting and absorbs offensive odors using a filter and absorbent, such as activated charcoal or a physical absorbent. A second technique catches cigarette smoke, or the like, in a paper filter under Coulomb effect provided by DC boosting, and generates a very small amount of ozone to decompose the offensive odor in the process of making the ozone. A third technique has a dust collector utilizing DC boosting, an easily cleanable filter, an ozone concentration sensor, an ozone generator, an ozone deodorizing catalyst, an acid gas absorbent and a scavenging fan serially combined in this order within a common wind tunnel to achieve a desired air cleaning affect (Japanese Patent Application 1991-289318 and Japanese Utility Model Application 1992-38674). A fourth technique which is well-known is based on a chemical deodorization technique utilizing a combination of an ozone generator, a deodorizing catalyst and an acid gas absorbent (Japanese Patent Application Disclosure 1991-143524). However, this technique based on chemical deodorization utilizing ozone is dangerous because it fails to consider a problem of secular change. Secular change, as used herein, refers to significant chemical changes such as those involving introduction or one or more oxygen atoms, beyond more oxidation in the form of transfer of electrons.

More specifically, the first technique mentioned above is disadvantageous in that, once the activated charcoal or physical absorbent has been saturated with offensive odor, the odor is emitted.

The second technique mentioned above relies upon the paper filter functioning to collect contaminants under the DC boosting Coulomb effect without use of a scavenging fan. This technique does not adequately protect against residual ozone. As a result, a relatively high value of residual negative ions will cause the wall surfaces of a room to darken, the defective ionization adversely affects human health, and the ozone concentration within the room increases at low temperature and low humidity.

The third technique overcomes the problems of the second technique, but the ozone concentration sensor often erroneously operates in response to miscellaneous gases, particularly cigarette smoke, and secular change of catalyst, or the like, makes it impossible to maintain a concentration of ozone exhausted from the system at a level less than 0.06 ppm.

Overpopulation and deterioration of office buildings, as well as apartments, causes the indoor spaces, including those used for human habitation and activities to be cut off from outside air For long periods of time. This promotes air pollution due to fungi, residual odors, or infectious microorganisms including bacteria. Additionally, outside air drawn into these buildings is often contaminated with NOx and SOx due to exhaust fumes of cars and factories. Seasonally, offensive odors and pollen is added to these gases.

Domestic residents used for daily living also suffer from biological odors due to particles of cigarette smoke, fungi, pet odors and wandering cockroaches.

SUMMARY OF THE INVENTION

In view of the above-mentioned problems, it is an object of the present invention to provide a system producing clean air such as that found in natural, outdoor, rich floral environments. The system provides dust collection, air sterilization, a forest bathing effect, deodorization and acid gas adsorption with safety and stability to thereby maintain a desired indoor air quality.

The objects set forth above are achieved, in accordance with the present invention, by an environment decontaminating system having air cleaning and deodorizing functions. The system includes a combination of a DC high voltage dust collector, a dust catching filter, an ozone generator, an odor/ozone turbulent mixing plate, a deodorizing catalyst, an acid gas absorbent, a suction scavenging fan and an ozone concentration sensor, wherein the ozone concentration sensor is placed near a clean air outlet.

According to a more detailed aspect of the invention, the ozone concentration sensor of the immediate invention serves to monitor and control the ozone concentration at the outlet of the system such that it remains lower than 0.06 ppm and thereby to compensate for any secular change possibly occurring in the desired function of the decontaminating system.

The present invention can be adapted to a particular environmental condition to improve a reliability of the ozone exhaust standard. Additionally, the useful life of the catalyst is prolonged in a system where the sensor is used to slow down generation of ozone at a temperature range in which biological odors are not significantly activated in human living spaces.

These and other aspects, advantages and features of the present invention will become apparent upon reading the Following more detailed description of the present invention and referencing the accompanying drawings, in which:

BRIEF DESCRIPTION OF THE DRAWINGS

FIG. 8 illustrates a diagram illustrating ozone concentration as a function of air flow with the ozone sensor at the system outlet;

FIG. 9 illustrates a diagram of ozone concentration with an ozone deodorizing catalyst ($MnO_3$);

FIG. 10 illustrates a diagram illustrating the ozone concentration over an extended time period;

DETAILED DESCRIPTION OF THE PREFERRED EMBODIMENTS

Figure 1:
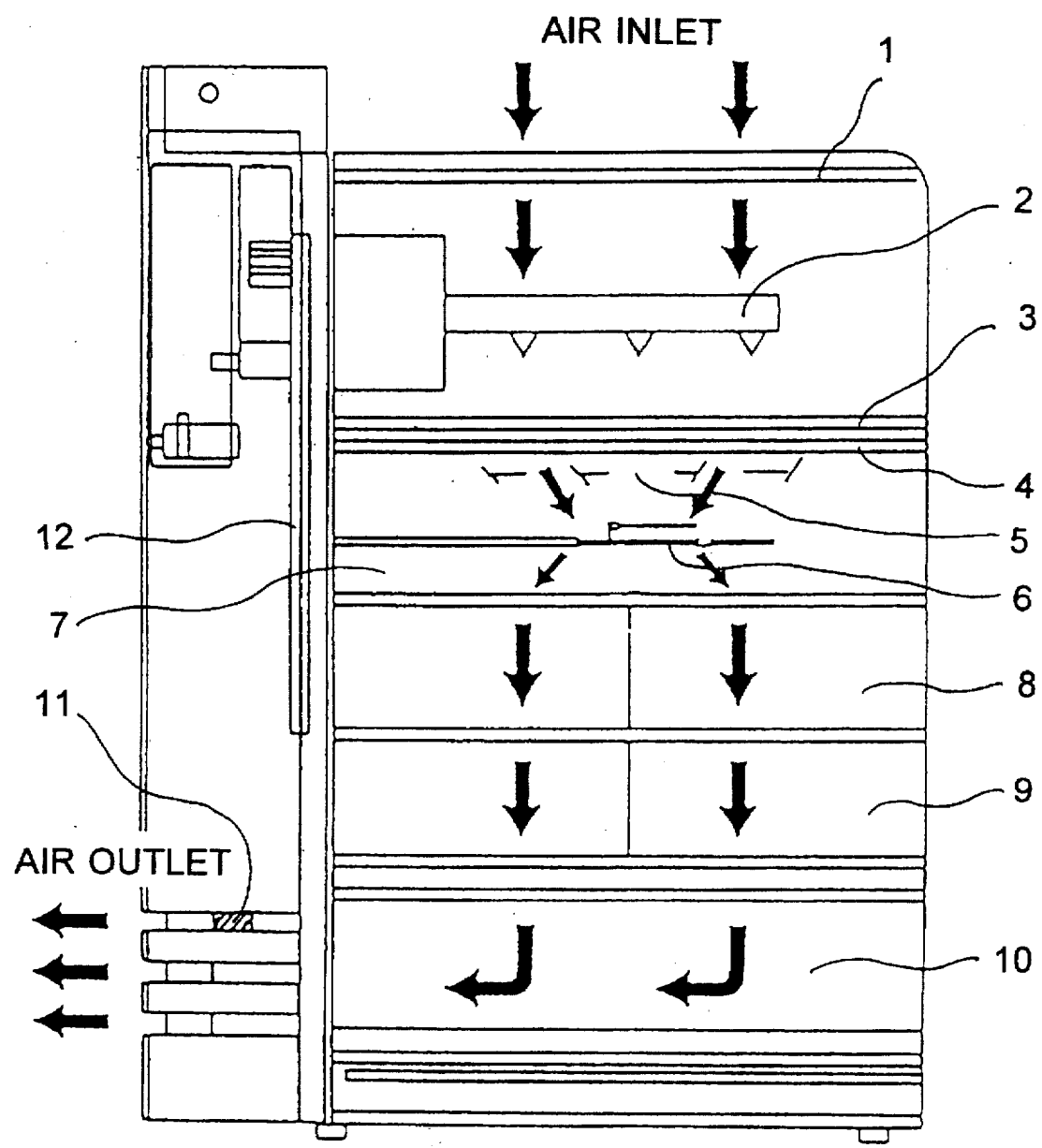
FIG. 1 is a schematic diagram illustrating an embodiment of the decontaminating system having air cleaning and deodorizing functions constructed according to the invention.

Referring to FIG. 1, an embodiment of the decontaminating system having air cleaning and deodorizing functions includes a wide-meshed screen 1 serving to remove visible dust floating in the air. Reference numeral 2 designates an ionic dust collecting electrode; reference numeral 3, designates a fibrous filter; and reference numeral 4 designates a DC anode section. Cigarette smoke, or the like, floating in the air is charged by DC high voltage ionic effect and caught by the fibrous filter 3 which can be easily washed and reused. Reference numeral 5 designates a gas phase ozone/odor reaction mechanism and reference numeral 6 designates an ozone generator provided with a diffusing plate adapted to homogenize the reactions of deodorization and sterilization occurring upon contact with the catalyst.

Reference numeral 7 designates a space for deodorization and sterilization. The homogenized ozone odor mixture is completely deodorized upon contact with the ozone deodorizing catalyst and an excessive concentration of ozone is eliminated. It should be noted that the ozone deodorizing catalyst always participates in repeated oxidation and reduction and, therefore, the ozone generation presents a cycle of, for example, ON for 5 minutes and OFF for 5 minutes with the scavenging fan being continuously operated.

Reference numeral 9 designates an acid gas absorbent used for adsorption of acid gases such as $NO_2$ and $SO_2$ generated by oxidizing effect of ozone and contributing to decomposition of the excessive ozone. Both the ozone deodorizing catalyst 8 and the acid gas absorbent 9 are provided in the form of honeycombs of which an SV value is adjusted so that a total volume valve of the ozone deodorizing catalyst 8 and the acid gas absorbent 9 are in a range from 30,000 to $100.000^{-h}$.

Reference numeral 10 designates a scavenging fan. This fan preferably comprises a brushless fan of high static pressure which structurally meets with sufficient wind resistance to assure a desired airflow.

Reference numeral 11 designates an ozone concentration sensor provided immediately behind the outlet and used to detect a concentration of ozone which has been cleaned by components 1–9. The components 1–9 function as filters to the sensor to eliminate the erroneous operation of the sensor due to cigarette smoke, or the like. To avoid deterioration of the ozone cleaning effect by the ozone deodorizing catalyst and the acid gas absorbent due to secular changes, the ozone gas phase concentration at the outlet is continuously monitored and, if the concentration exceeds a level of 0.06 ppm, a control unit 12 is activated to initiate a period of ozone generation.

Figure 2:
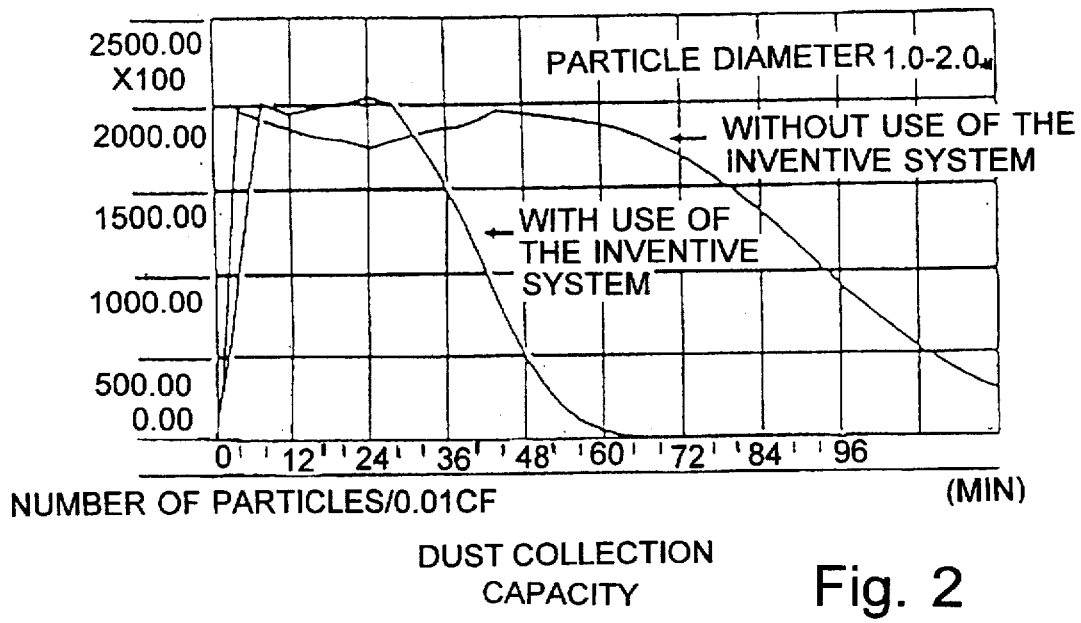
FIG. 2 is a illustrates the dust collecting capacity by the number of particles which can be collected as a function of time using the present invention and without the present invention.
Figure 3:
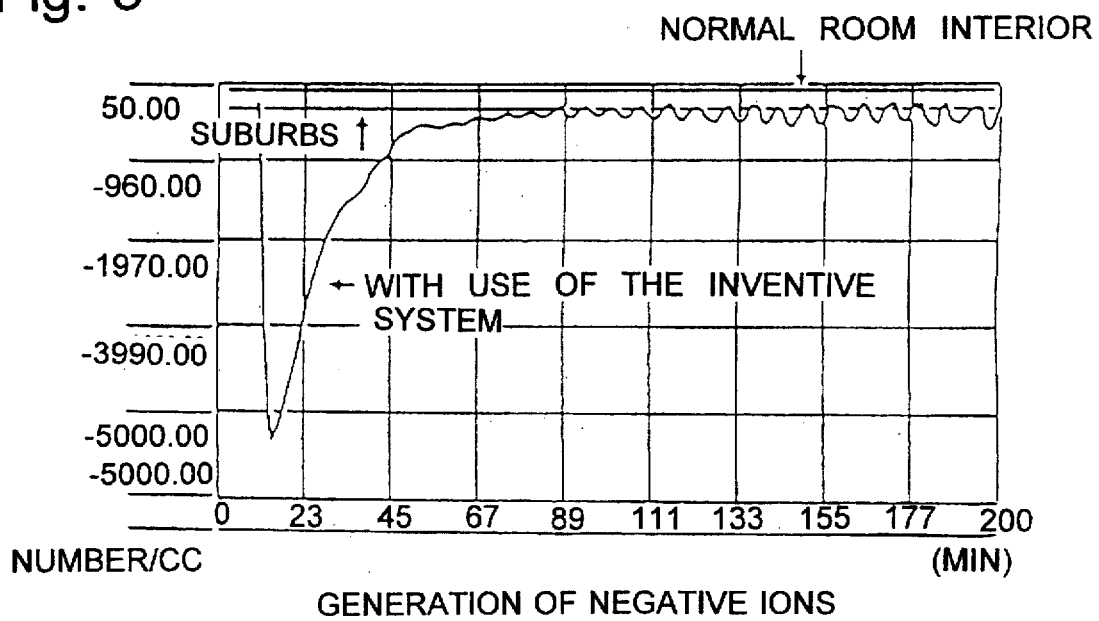
FIG. 3 illustrates the number of negative ions in a room as a function of time stabilized by the present invention.

FIG. 2 shows a result of the dust collecting function as illustrated in FIG. 1 utilizing the DC high Coulomb effect and a state of the decontaminated indoor environment. FIG. 3 indicates the number of negative ions in the room well stabilized down to the number of negative ions usually found in the air in suburbs covered with rich green.

As will be apparent from FIG. 3, the number of negative ions does not increase, and is stabilized to 260/cc usually observed in the air of suburbs covered with rich green so long as no significant contaminant load is generated again in the room.

However, the number of negative ions is abruptly increased by particles of cigarette smoke, or the like, and a significant function of dust collection is initiated, as will be appreciated from the time required for removal of such particles shown by FIG. 2. It will also be apparent from FIG. 2 that a value of drive current is automatically controlled within a range from 30 mA to 70 mA in response to variation of the contaminant load.

Figure 4:
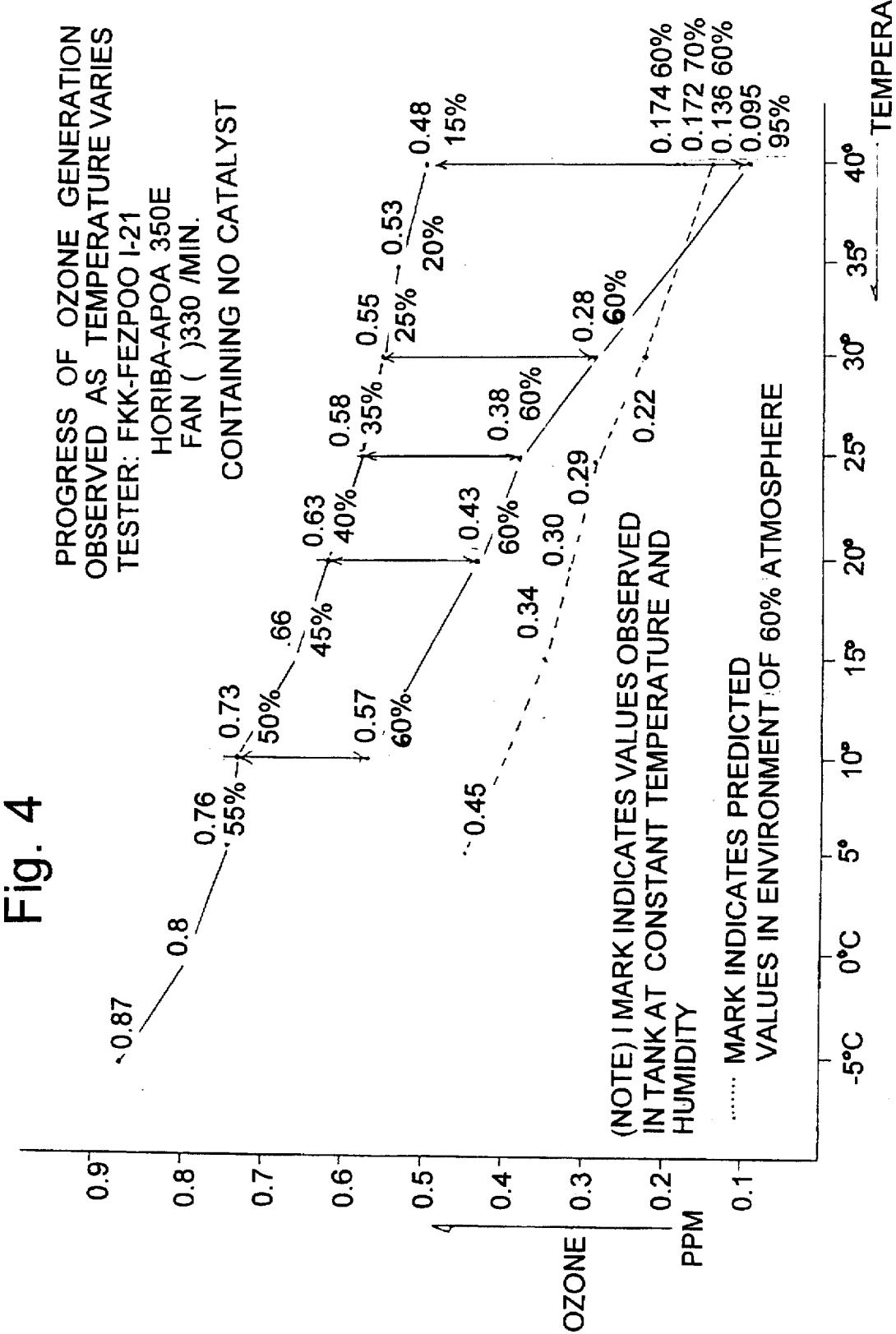
FIG. 4 illustrates ozone generation as a function of temperature and humidity.

Generation of ozone is apt to be affected by temperature and humidity. FIG. 4 indicates such variation in generation of ozone. FIG. 4 indicates a variation in the generation of ozone as a function of temperature and humidity when electric current of 70 mA is applied to the ozone generator and the scavenging fan supplies an airflow of 330 l/min. As seen in FIG. 4, the gas phase ozone concentration of 0.43 ppm at 20 degrees C., 60% RH increases by 46% up to 0.63 ppm at the same temperature and a humidity of 40% RH.

While the environment decontaminating system having air cleaning and deodorizing functions according to the invention is initially arranged so that the ozone gas phase concentration off approximately 0.3 ppm is available for deodorization, generation of ozone is seasonally varied. For example, the ozone gas phase concentration of 0.3 ppm, at a normal temperature of 20 degrees C., is increased by 50% up to 0.45 ppm at 5 degrees C.

At normal temperatures (18 degrees C. to 25 degrees C.), it is presumed that biological odors will be present and the ozone deodorization can be smoothly performed.

It is also possible at the normal temperature to maintain the concentration of ozone at the outlet of the system at a level lower than 0.06 ppm. However, the reactivity of oxidation/reduction taking place upon contact with manganese dioxide containing catalyst ($MnO_3$) is slowed down as the gas phase ozone concentration increases at a temperature lower than 10 degrees C. and a relatively low humidity.

Figure 5:
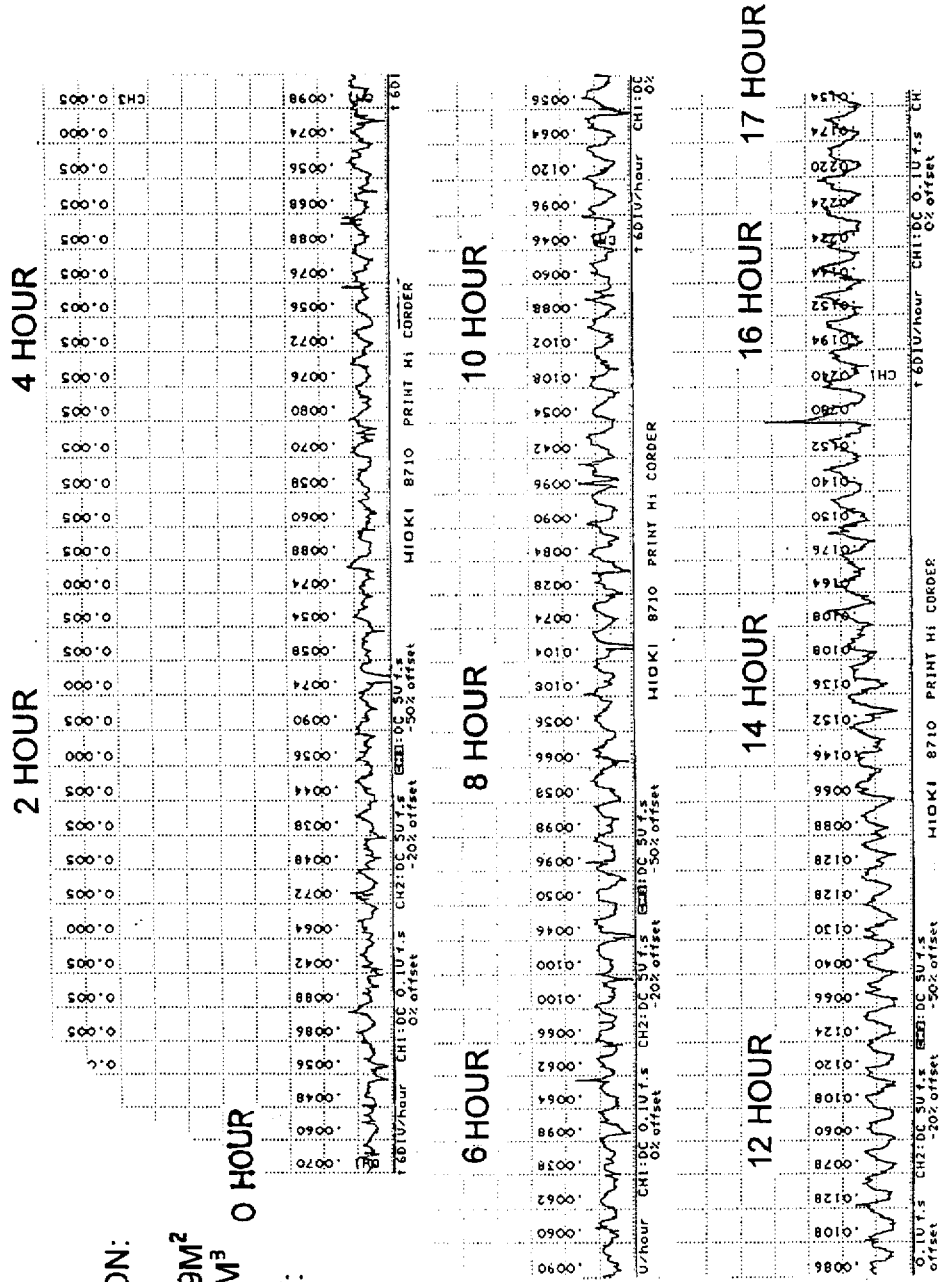
FIG. 5 illustrates ozone concentration in concentration over a 17 hour period.

FIG. 5 indicates the ozone concentration as measured at the outlet of the system at 20 degrees C., 60% RH after generation of ozone has been turned ON for 3.5 minutes and turned OFF for the stone period, repeatedly, and the deodorizing catalyst, as well as the acid gas absorbent have been loaded.

FIG. 5 assumes that the gas phase ozone concentration is adjusted to 0.3 ppm (at 20 degrees C., 60% RH) relative to a given scavenged airflow and SV value of the combined deodorizing catalyst and acid gas absorbent is adjusted to 50,000$^{-h}$. As indicated, a decontaminating capacity is initially as high as 96%, but decreases down to 91% after passage of 17 hours in a state where there are no factors to be decomposed (for example, odor). FIG. 5 shows the variation in the gas phase ozone concentration under the aging effect at the normal temperature and humidity, and suggests that this gas phase ozone concentration does not reach 0.06 ppm.

However, in the environment indicated in FIG. 4, having a lasting relatively low temperature and a relatively low, humidity an ozone concentration level of 0.06 ppm will not be exceeded if the decontaminating capacity of the catalyst decreases and no deodorizing reaction takes place.

Figure 6:
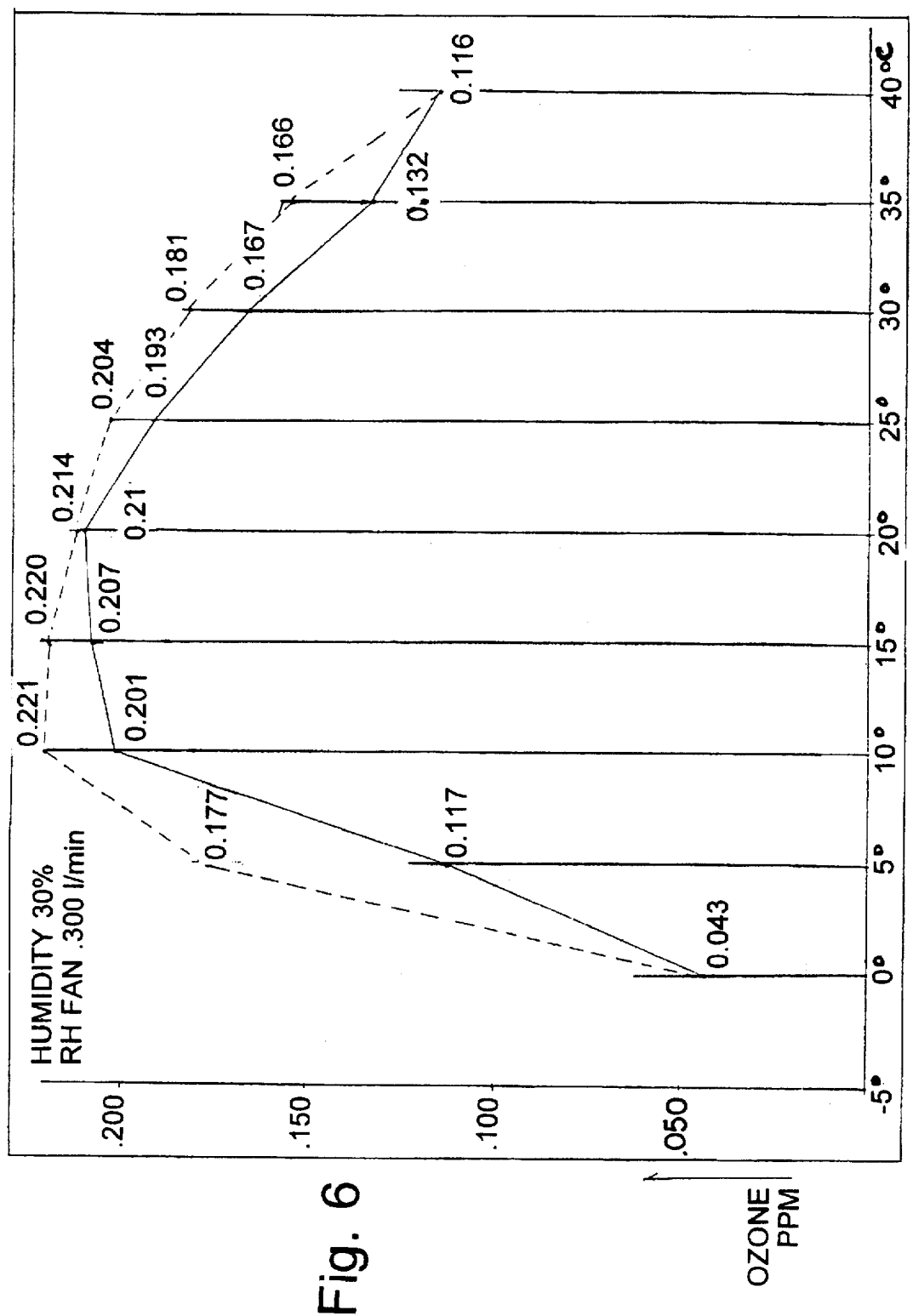
FIG. 6 illustrates the ozone concentration in parts per million as a function of temperature.

FIG. 6 shows an improvement of ozone generating characteristics as indicated in FIG. 4. Specifically, FIG. 6 indicates a temperature-dependent variation of the gas phase ozone concentration at a relatively low humidity.

Generation of ozone remarkably decreases at a temperature lower than 10 degrees C. This suggests that the generation of ozone increases in a temperature range in which biological odors are generated.

FIG. 6 also indicates that the ozone concentration at the outlet of the system can be maintained at a level lower than 0.06 ppm without deterioration of the catalytic efficiency al low temperatures and low humidity.

Figure 7:
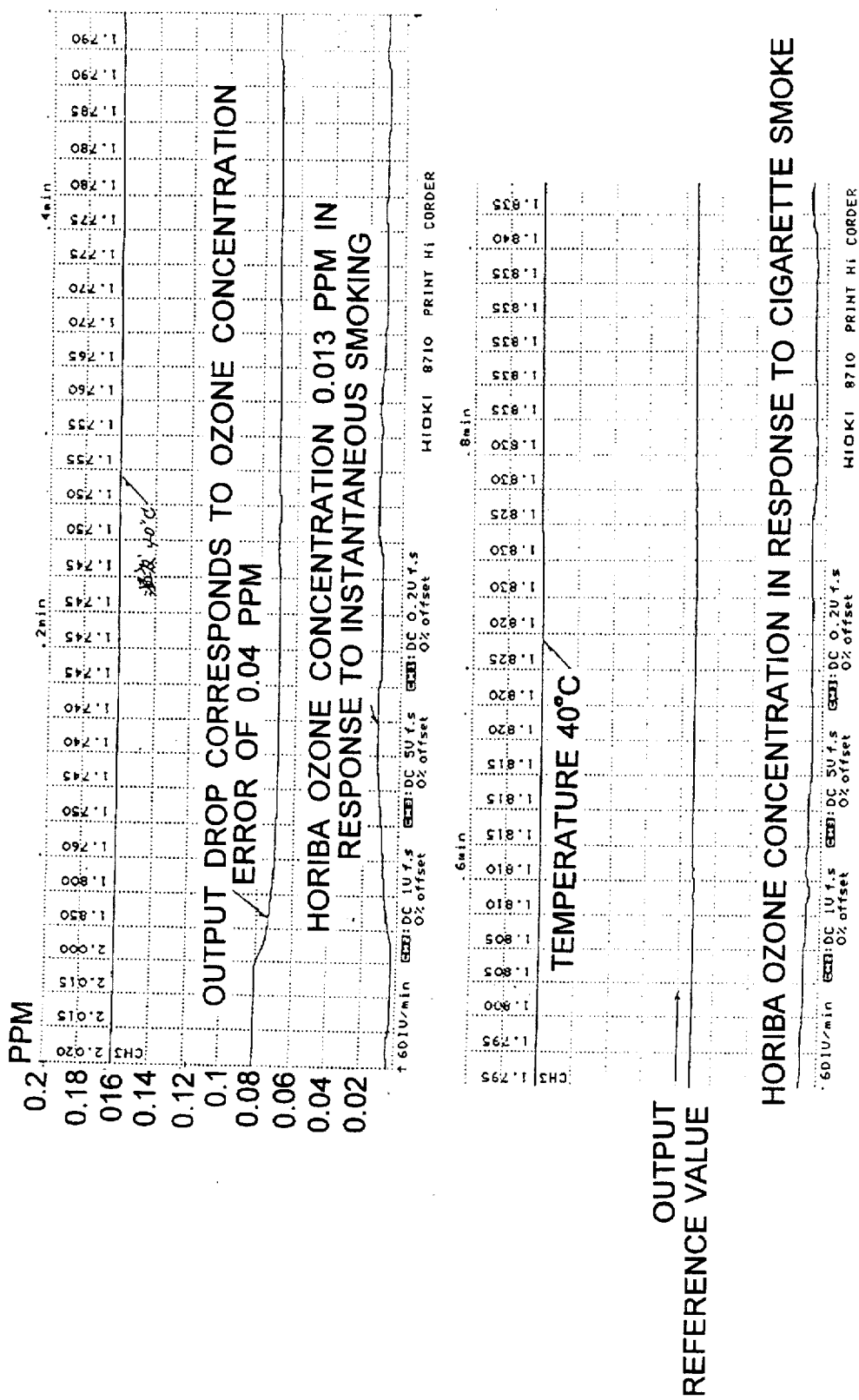
FIG. 7 illustrates a change in the output of the ozone sensor in the form of the gas phase ozone when cigarette smoke is blown directly on the ozone sensor.

FIG. 7 shows the effect of miscellaneous gases on the ozone sensor. FIG. 7 indicates a change in the output of the ozone sensor in the form of the gas phase ozone concentration appearing when the cigarette smoke is blown directly to the ozone sensor. As will be apparent from FIG. 7, improper placement of the ozone concentration sensor always causes an erroneous operation of the sensor. Thus, when it is desired to employ the ozone sensor to monitor the ozone concentration at the outlet of the system, all the functions for air cleaning such as dust collecting, ozone chemical deodorization and acid gas adsorption are used as the ozone sensor protecting filter to avoid such erroneous operation.

Figures 11, 12:
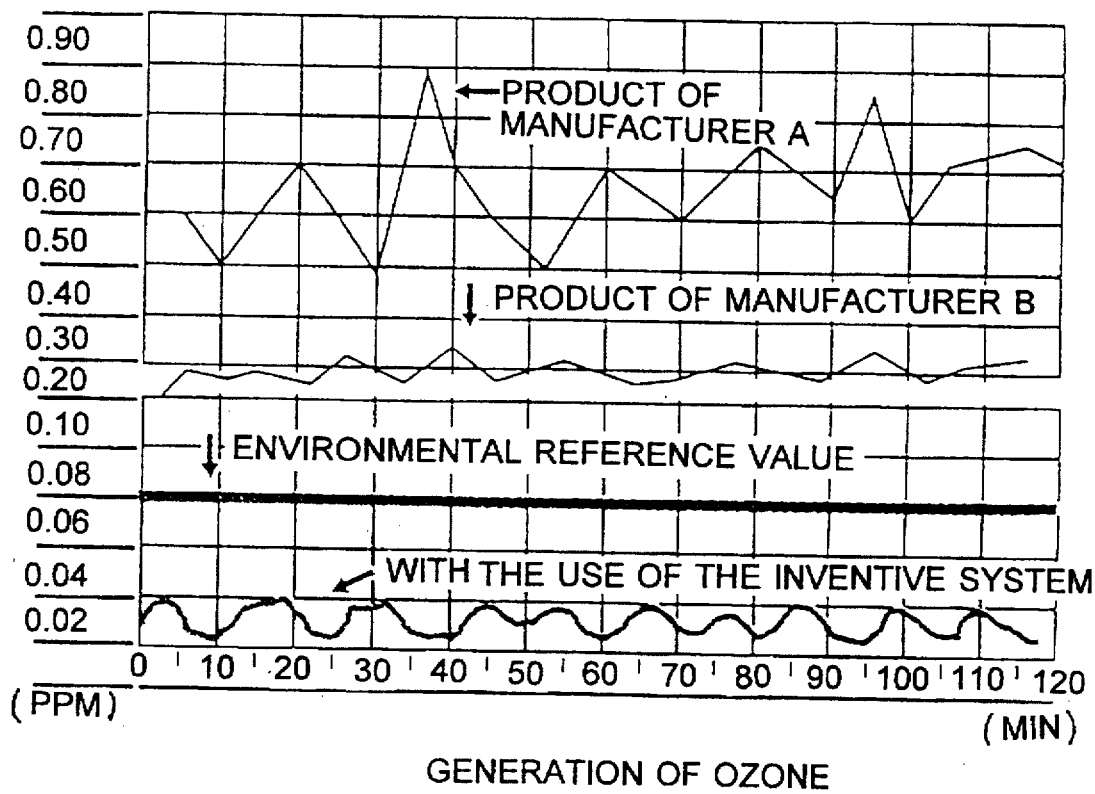
FIG. 11 illustrates a diagram illustrating gas phase ozone concentration as a function of time for prior art products and the immediate invention.
FIG. 12 illustrates the effect of the present invention on $NO_x$ and $SO_x$.
Figure 13:
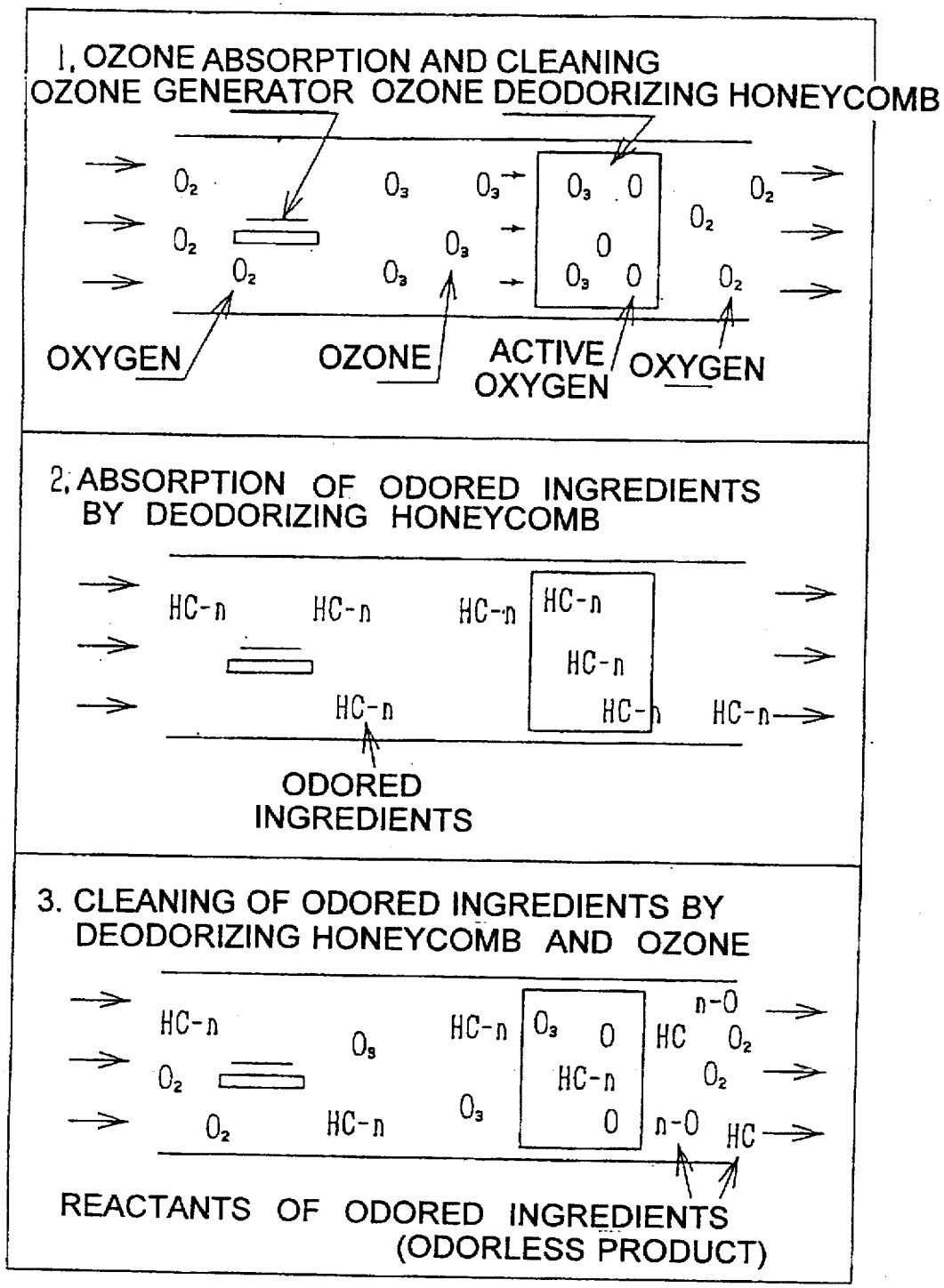
FIG. 13 illustrates a diagram illustrating odored ingredient decomposition by the ozone deodorizing catalyst and ozone.

FIGS. 8-10 show data obtained by providing the ozone concentration sensor at the outlet of the system. FIG. 8, section A, indicates data obtained with the gas phase ozone concentration of 0.145 ppm and the scavenged airflow of 330 l/min. FIG. 8, section B, shows the gas phase ozone concentration generated under the conditions of FIG. 8, section A, is controlled by the ozone sensor, namely, detecting a concentration of 0.035 ppm, the ozone sensor controls generation of ozone by turning ON for 3 minutes and 10 seconds and turning OFF for the same period. FIG. 9 indicates a case in which only the ozone deodorizing catalyst ($MnO_3$) which has already been used in a harsh test is loaded in the system and ozone leak is controlled by the ozone sensor. The level of 0.06 ppm is never exceeded. FIG. 10, section A, indicates data obtained by environment-dependent aging in the same condition. FIG. 10, section B indicates generation of ozone is slowed down at a temperature lower than 10 degrees C. and the ozone concentration at the outlet of the system never exceeds the level of 0.06 ppm. FIG. 11 indicates the gas phase ozone concentration in comparison to the result of competitive manufacturers products and data on the acid gas adsorption. FIG. 12 indicates a scheme of odor ingredient decomposition by the ozone deodorizing catalyst and ozone.

Table 1 is a list showing results of the deodorization test.

TABLE 1

| | LIST OF RESULT FROM DEODORIZING TEST | | | | | |
|---|---|---|---|---|---|---|
| Elapsed Period | Types of Odor | | | | | |
| | Perfume | Garlic | Naphthalene | Gasoline | Cigarette | Blank |
| 0 min. | 4 | 4 | 4 | 4 | 4 | 0 |
| 1 min. | 2 | 3 | 3 | 4 | 4 | — |
| 10 min. | 1 | 2 | 1 | 4 | 4 | 1 |
| 20 min. | — | 1 | — | — | 4 | — |
| Initial Concentration of Injected Quantity of Odor Source | vegetable perfume | raw garlic | gas phase of reagent naphthalene | | fume from one piece of mild seven | only air |
| Remarks | — | — | — | — | — | only de-odorizer idling |

| 6-Ranked Odor Intensity Table | |
|---|---|
| Odor Intensity | Content |
| 0 | odorless |
| 1 | barely sensible odor (detection threshold concentration) |
| 2 | barely recognizable odor (recognition threshold concentration) |
| 3 | easily sensible odor |
| 4 | strong odor |
| 5 | intense odor |

1. Numbers in table represent odor intensities according to 6-ranked odor intensity indication
2. Garlic odor was prepared by introducing 0.06 g of mashed raw garlic into 5 l air bag and, after 15 minutes, transferring 200 ml of gas in 5 l air bag to 70 l air bag.
The deodorizing effect for biological odors was verified by the results as shown.

The environment decontaminating system having air cleaning and deodorizing functions constructed according to the invention employs, as a power source for the DC high voltage dust collecting function, a power source having a 12 volt DC input which is boosted up to 6.0 KV with electric current lower than 70 mA. The DC high voltage section and a grounded electrode section are protected against wind resistance and the grounded electrode is formed by a wire net or carbon fiber. A dust catching filter is provided closely adjacent, above, or below the grounded electrode; preferably, at a distance less than 20 mm from the grounded electrode.

The airflow is less than 1.0 m/see and the dust catching filter catches 50% or more of the dust input thereto With such settings, when a person smokes a cigarette in a room smaller than 17 m², the number of negative ions continues to be 5,000/cc during an initial 20 minutes and thereafter is stabilized down to a value or 260/cc as the load of smoke and dust decreases. This stabilized value is comparable to the value of negative ions usually observed in outdoor, suburban environments.

This stabilized number of negative ions will be maintained unless the contaminant load in the room increases.

It is well-known that ozone decomposes a double bond which is the prime mover of offensive odor and is most effective for deodorization. A honeycomb of manganese-containing catalyst for oxidation may be provided along with the ozone generator to promote the deodorizing reaction and to decompose any excessive ozone (Japanese Patent Application 1989- 115352).

Generation of ozone is performed utilizing a creeping discharger including a fine ceramic dielectric layer less than 130 micrometers thick so as to generate ozone at a concentration lower than 1.0 ppm (normal temperature of 20 degrees C., normal humidity of 60% RH) (Japanese Patent Publication 1980-37483). In view of the fact that the concentration of the ozone generated depends on the temperature and humidity, and the fine ceramics themselves are hygroscopic, there is provided a heating element having a heating value higher than a normal temperature by 20 degrees C. to 30 degrees C. (Japanese Patent Application 1989-33004) so as to protect the discharger against destruction due to a high humidity and thereby to facilitate generation of ozone even in a humid environment, although the ozone generating efficiency and, therefore, a gas phase ozone concentration, will be lower at such high humidity.

At relatively low temperatures and humidity, the gas phase ozone concentration increases by one and one-half times compared to that at the normal temperature of 20 degrees C. and the normal humidity of 60% RH, such that the manganese-containing catalyst will be deteriorated in the absence of the odor.

According to the invention, the indoor environment to be provided with the decontaminating system is roughly classified into the indoor environment requiring decomposition of odor above all and the other indoor environment so that operation of the ozone generator may be easily controlled depending on this classification.

Generally, microorganisms including fungus and bacteria are activated at a temperature range of 10 degrees C. to 40 degrees C. and no significant increase of odor is observed at a temperature lower than 10 degrees C.

Accordingly, in the environment which is to be decontaminated with a priority of decomposition of odor but at a temperature lower than 10 degrees C., a threshold value of the ozone generator comprising fine ceramics is preset so that its excitation level depends on the environment temperature and discharge may be slowed down at a low temperature and a low humidity (see FIG. 2).

Such countermeasure has been found to be effective to prevent the manganese-containing catalyst ($MnO_3$) from being deteriorate due to oxidation of ozone rich gas and to eliminate an excessively high concentration of residual ozone after passage through the catalyst, which otherwise might adversely affect the human body.

Ozone ranks next to fluorine in its oxidation capacity. Therefore, direct use of gas phase ozone for chemical deodorization is dangerous since nitrogen monoxide (NO) and sulfur monoxide (SO) contained in heating equipment combustion gas generated in a living environment, or automobile exhaust gas intruding from the outside air, could be further oxidized by ozone to $NO_2$ and $SO_2$, respectively, which can injure humans.

To achieve reliable, safe air cleaning for human environments, acid gas must be removed by adsorption before scavenging (see FIG. 3).

According to one aspect of the invention which includes a combination of dust collection by negative ions, deodorization by ozone and acid gas adsorption is provided in front of the suction scavenging fan. An ozone concentration sensor is provided immediately behind the outlet scavenging fan.

With this arrangement, both the particles of cigarette smoke, or the like, and tar contained therein are effectively removed. Additionally, the chemical deodorization and the acid gas adsorption serve as a protective filter for the ozone concentration sensor to avoid an erroneous operation of the ozone concentration sensor due to miscellaneous gases. It should be understood that while the dust collecting function utilizing negative ions is not subject to secular change, ozone, ozone deodorizing catalyst and acid gas absorbent cannot be free from secular changes.

The load of contaminants and odors in an indoor environment seasonally varies, largely dependent upon temperature and humidity.

The ozone concentration sensor of the immediate invention serves to monitor and control the ozone concentration at the outlet of the system such that it remains lower than 0.06 ppm and thereby to compensate for any secular change possibly occurring in the desired function of the decontaminating system.

As will be understood from the foregoing description, the present invention provides an environment decontaminating system having air cleaning and deodorizing functions allowing clean air of a quality provided by nature in areas covered with rich green foliage to be reproduced within an indoor space by utilizing dust collection, air sterilization, forest bathing effect, deodorization and acid gas adsorption with safety, as well as stability, and without any erroneous operation of the system.

Although the invention has been described with respect to specific preferred embodiments thereof, many variations and modifications will become apparent to those skilled in the art. It is, therefore, the intention that the appended claims be interpreted as broadly as possible in view of the prior art to include all such variations and modification.

The embodiments of the invention in which an exclusive property or privilege is claimed are defined as follows:

1. An environment decontaminating system having air cleaning and deodorizing functions comprising:

a housing;

an inlet on said housing;

a filter disposed in said inlet;

a DC dust collector positioned adjacent said inlet in said housing;

a dust catching filter positioned adjacent said dust collector;

an ozone generator positioned downstream and adjacent said filter means, adjacent said ozone generator, for mixing air with ozone produced by said ozone generator;

a deodorizing catalyst positioned downstream of said ozone generator;

an acid gas absorbent positioned downstream and adjacent said catalyst;

a scavenging fan positioned downstream and adjacent said absorbent;

an ozone concentration sensor positioned adjacent said fan, said sensor having an output; and an outlet on said housing, wherein said concentration sensor is positioned near said outlet and provides a signal at said output indicating an ozone concentration at said outlet.

2. The environment decontaminating system as defined in claim 1, wherein said ozone generator is operably coupled to said sensor output to control said ozone generator in response to ozone concentrations detected proximate said outlet.

3. The environment decontaminating system as defined in claim 1, wherein said ozone concentration sensor is positioned immediately behind said outlet, and said sensor output is coupled to said ozone generator such that said ozone generator is adjusted to vary the amount of ozone generated thereby when the sensor detects that an ozone concentration at said outlet exceeds a predetermined level.

4. The environment decontaminating system as defined in claim 3, wherein said ozone concentration achieved by said ozone generator at said outlet is approximately 0.06 ppm.

5. The environment decontaminating system as defined in claim 1, wherein said sensor is operably coupled to said ozone generator to produce an output which reduces the generation of ozone at a temperature range in which biological odors are not significantly activated to prolong the useful life of said catalyst.

6. The environment decontaminating system as defined in claim 1, wherein said sensor output is coupled to said ozone generator to control the ozone level at said outlet and said sensor is positioned adjacent said outlet such that said dust collector, said deodorizing catalyst and said acid gas absorbent filter the air before it reaches said sensor to avoid erroneous operation of said ozone concentration sensor due to miscellaneous gases.

7. An environment decontaminating system having air cleaning and deodorizing functions comprising:

a housing having an air inlet and an air outlet, said housing enclosing therein: a DC dust collector operating in a voltage range of about 6 KV for producing a Coulomb effect; an ozone generator having a dielectric layer formed from a ceramic; a control unit operably coupled to said ozone generator; an ozone deodorizing catalyst; an acid gas absorbent; said ozone deodorizing catalyst and said acid gas absorbent having a honeycomb configuration and a total volume value ranging between $30,000^{-h}$ and $100,000^{-h}$; and a scavenging fan arranged respectively from said air inlet to said air outlet; and an ozone concentration sensor provided adjacent said air outlet, wherein a gas phase concentration of ozone exiting said air outlet is monitored by said ozone concentration sensor which generates an output received by said control unit which in turn controls said ozone generator.

8. A device for removing airborne contaminants from an enclosed space, comprising:

a housing having an air inlet and an air outlet for passing an air stream therethrough and containing the airborne contaminants;

a filter disposed within said air inlet for physically removing a portion of the airborne contaminants;

an electrode formed from a wire mesh or carbon fiber, disposed within said housing adjacent said filter for electrically charging the airborne contaminants in said air stream passing through said filter;

a dust collection assembly disposed downstream and adjacent said electrode, and having a washable, reusable fibrous filter section, and a direct current anode section, cooperatively operating to attract and trap the airborne contaminants within said air stream charged by said electrode;

means downstream and adjacent said dust collection assembly for reacting the airborne contaminants within said air stream with ozone, including a heat-controlled creeping discharge ozone generator for introducing ozone into said air stream at a concentration of less than 1.0 parts per million;

a deodorizing catalyst assembly disposed downstream and adjacent said reacting means for facilitating oxidation/reduction chemical processes on the airborne contaminants within the air stream;

an acid gas absorbent assembly disposed downstream and adjacent said deodorizing catalyst for removing acidic gases from the air stream produced in said reacting means said deodorizing catalyst assembly;

a scavenging fan disposed downstream and adjacent said acid gas absorbent assembly for moving the air stream into said inlet, through said housing and out said outlet; and an ozone concentration sensor disposed downstream of said acid gas absorbent assembly for producing an output signal indicative of levels of ozone within said air stream exiting said outlet.

* * * * *

UNITED STATES PATENT AND TRADEMARK OFFICE
CERTIFICATE OF CORRECTION

Page 1 of 2

PATENT NO. : 5,681,533
DATED : October 28, 1997
INVENTOR : Tsutomu Hiromi

It is certified that error appears in the above-identified patent and that said Letters Patent is hereby corrected as shown below:

Column 2, line 58;

Delete "is a".

Column 3, line 59;

"valve" should be --value--.

Column 3, line 66;

"art" should be --an--.

Column 4, line 42;

"off" should be --of--.

Column 5, line 24;

"al" should be --at--.

Column 7, line 13;

"1.0 m/see" should be --1.0 m/sec--.

Column 7, line 18;

"value on" should be --value of--.

UNITED STATES PATENT AND TRADEMARK OFFICE
CERTIFICATE OF CORRECTION

PATENT NO. :  5,681,533
DATED      :  October 28, 1997
INVENTOR   :  Tsutomu Hiromi It is certified that error appears in the above-identified patent and that said Letters Patent is hereby corrected as shown below:

Column 8, line 5;

"($MnO_3$" should be --($MnO_3$)--.

Column 10, claim 8, line 46;

After "reacting means" insert --and--.

Signed and Sealed this

Second Day of June, 1998

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,681,533
DATED : October 28, 1997
INVENTOR(S) : Tsutomu Hiromi

It is certified that error appears in the above-identified patent and that said Letters Patent is hereby corrected as shown below:

Title Page 1, at [73];

"Yushin Engineering, Japan" should be --Yushin Engineering, Japan and Kabushiki Kaisha Maruzen Create, Japan--.

Signed and Sealed this

Twentieth Day of October, 1998

*Attest:*

BRUCE LEHMAN

*Attesting Officer*  Commissioner of Patents and Trademarks